United States Patent [19]

Meyer

[11] Patent Number: 4,621,912

[45] Date of Patent: Nov. 11, 1986

[54] FORAMINATED OPTICAL CONTACT LENS

[76] Inventor: Donald R. Meyer, 17 Wilcox Ave., Meriden, Conn. 06450

[21] Appl. No.: 701,407

[22] Filed: Feb. 14, 1985

[51] Int. Cl.⁴ ............................ G02C 7/04; B23K 9/16
[52] U.S. Cl. ............................. 351/160 R; 219/69 R
[58] Field of Search .............. 351/160 R, 160 H, 161, 351/162; 219/69 R

[56] References Cited

U.S. PATENT DOCUMENTS 3,227,855  1/1966  Meyer, Sr. et al. ................. 219/384
3,833,786  9/1974  Brucker ........................... 351/160 R

OTHER PUBLICATIONS

Lombard Lenses (advert.); "Micropore: The Hard Lens that Breathes"; *Optometric Weekley;* Oct. 12, 1972; p. 33.

Neill, J. C.; "Electronic Venting of Corneal Contact Lenses"; *Contacto;* vol. 11, No. 2; Jun. 1967; pp. 9-11.

*Primary Examiner*—John K. Corbin
*Assistant Examiner*—Scott J. Sugarman
*Attorney, Agent, or Firm*—McCormick, Paulding and Huber

[57] ABSTRACT

A transparent microporous optical contact lens having a lens body including a contact surface and a frontal surface. A plurality of micro-passageways extend through the lens body between the contact surface and the frontal surface. Each of the micro passageways has a pair of generally cylindrical inwardly converging end portions which communicate with a diametrically enlarged generally spherical intermediate portion located between said end portions.

10 Claims, 3 Drawing Figures

FORAMINATED OPTICAL CONTACT LENS

This invention relates in general to optical contact lenses and deals more particularly with an improved foraminated corneal contact lens having microporosity for fluid permeability essential to the physiological health and well being of the eye.

In contact lens wear, it is essential that the eye receives sufficient oxygen and that sloughed-off epithelial cells and metabolic wastes be removed. Further, it is important that these functions be performed in such a manner that clear vision from the contact lense is maintained for a long period of time and with minimal care.

Spectral microscopy studies on extended wear contact lens has shown that endothelial cell layer changes occur. Further, it has been found that gas permeable lenses help to eliminate edema (corneal swelling), however, noted contact lense authorities have generally found that fluid permeability is still necessary to remove sloughed-off epothelial cells and metabolic wastes, which is essential to the physiological health and well being of the eye.

Various methods have been devised for forming holes in contact lens. Mechanical drilling to provide fenestrations has been employed. However, such drilling has the disadvantage of leaving sharp edges and microscopic burrs which necessitate additional laborious polishing, using nylon thread and the like. Laser formed holes have also been employed, however, the laser process tends to produce a hole having pearly white walls and elevations of plastic, 5 to 6 microns at the hole edges. Therefore, this process has not been extensively used.

In accordance with the present invention, an improved foraminated or microporous contact lense is provided which may be produced by a method taught in U.S. Pat. No. 3,227,855 to O. E. Meyer, Sr. et al for Methods and Apparatus for Electrically Piercing Microscopic Holes in Dielectric Materials, issued Jan. 4, 1966. The use of improved electrodes in the apparatus disclosed in the aforementioned patent to Meyer, Sr., et al has enabled the provision of an improved foraminated or microporous contact lens having substantially microscopic passageways therethrough of unique form as will be hereinafter further discussed. The aforesaid process provides an efficient and inexpensive method to provide lenses of improved fluid permeability which supply more oxygen to the eye than hereinbefore generally possible while removing sloughed-off epithelial cells and metabolic wastes. Further advantages are derived from the aforesaid improved lenses which are hereinafter more fully described in that the microscopic passageways through the lens are less prone to clogging and do not interfere with clear vision.

SUMMARY OF THE INVENTION

A microporous contact lens has a transparent lense body and includes a contact surface and a frontal surface. A plurality of micro-passageways extend through the lens body between said contact surface and said frontal surface. Each micro-passageway has generally conically tappered end portions which diverge inwardly and communicate with an enlarged portion therebe- tween.

BRIEF DESICRIPTION OF THE DRAWING

DETAILED DESCRIPTION OF PREFERRED EMBODIMENT

Figure 3:
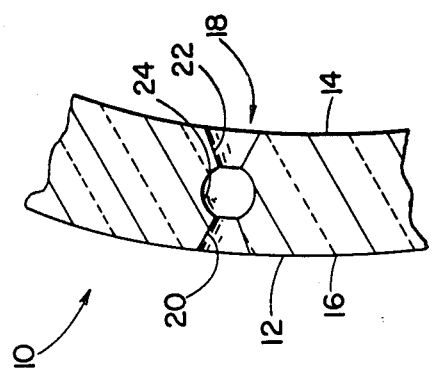
FIG. 3 is a somewhat further enlarged fragmentary sectional view similar to FIG. 2 and showing a typical micro passageway.
Figure 2:
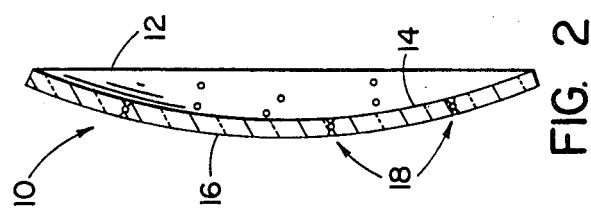
FIG. 2 is a somewhat enlarged sectional view taken along the line 2, 2 of FIG. 1.

Turning now to the drawing, a foraminated microporous optical contact lens embodying the present invention is indicated generally by the reference numberal 10. The invention may be practiced with contact lenses of either hard or soft type. However, the illustrated lens 10 is preferably a hard contact lens and has a lens body made from a suitable plastic material such as a silicone plastic and includes a contact surface 14 and a frontal surface 16. At least one micropore or passageway indicated, generally at 18, extends through the lens body 12 and opens through the contact surface 14 and the frontal surface 16.

In accordance with the present invention, the micropore or passageway 18 is shaped to provide a substantially continuous pumping action from the contact surface 14 toward the frontal surface 16, which occurs even in the absence of blinking of the wearers eye.

Figure 1:
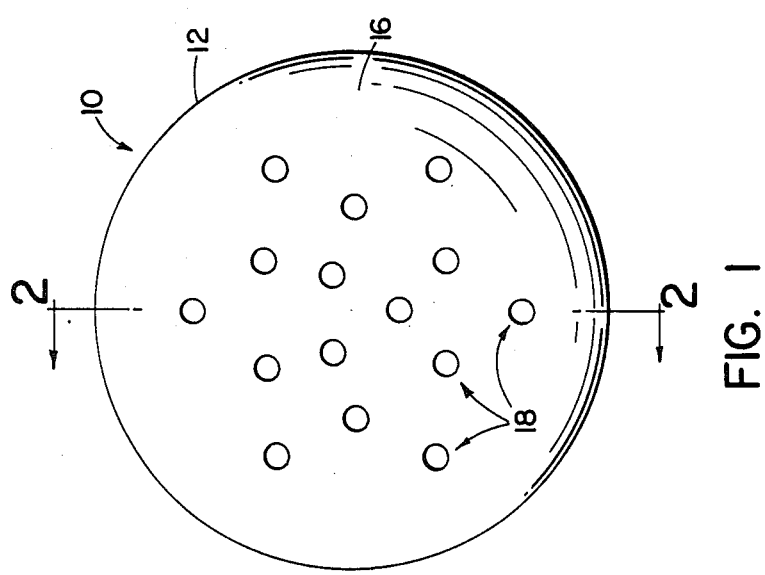
FIG. 1 is a front elevational view of a microporous contact lens embodying the present invention.

The number of passageways formed in a lens may vary. However, preferably between 10 and 20 passageways are provided. Permeability tests on microporous hard contact lenses indicate that 15 micropores distributed over the lens surface, substantially as shown in FIG. 1 provide optimal permeability without distortion or other interference with vision.

Referring now particularly to FIG. 3 a typical micropore or passageway 18 is shown. The illustrated passageway 18 extends through the lens body 12 and has opposite end portions indicated at 20 and 22 and best shown in FIG. 3. Each passageway further includes an enlarged portion which is 24 located intermediate the end portions 20 and 22 and which communicate with each of the end portions, substantially as shown in FIG. 3. The passageway 18 is preferably arranged in axially normal relation to at least one of the surfaces 14 and 16.

The generally cylindrical end portions 20 and 22 are preferably conically tappered and converge in the direction of the enlarged portion 24 located therebetween. Preferably, and as shown, the enlarged portion 24 has a major cross-sectional area at least equal to the major cross-sectional area of either of the end portions 20 and 22. In the illustrated embodiment the enlarged portion 24 has a generally spherical configuration and a major cross-sectional area slightly greater than that of either of the end portions 20 and 22.

Each micro passageway may be generally described as a bifunneled, venturi-type, reverse Bernoullian pump.

Due to the unique shape of the micro passageways in the lens lacrimal fluid flows through the passageways with a pumping action to carry away sloughed-off epithelial cells and metabolic wastes. Changes in fluid stream pressure which occur within each micro passageway 18 induce the pumping action and tend to prevent passageway clogging while providing sufficient oxygen to the eye and effecting a desired washing action, so that the lens may be worn for a prolonged period of time with minimal care.

I claim:

1. A contact lens comprising a transparent lense body having a contact surface and a frontal surface and defining at least one axially elongated micro passageway extending though said lense body and having opposite end portions, one of said end portions opening through said contact surface, the other of said end portions opening through said frontal surface, said micro passageway having a radially enlarged portion intermediate said end portions and communicating with said end portions.

2. A contact lens as set forth in claim 1 wherein said enlarged portion has a major cross-sectional area at least equal to the major cross-sectional area of either of said end portions.

3. A contact lens as set forth in claim 2 wherein said enlarged portion has a major cross-sectional area greater than the major cross-sectional area of either of said end portions.

4. A contact lens as set forth in claim 2 wherein said enlarged portion has a generally spherical configuration.

5. A contact lens as set forth in claim 4 wherein said end portions are generally cylindrical.

6. A microporous contact lens as set forth in claim 4 wherein said end portions comprise generally conically tapered portions converging in the direction of said enlarged portion.

7. A contact lens comprising a transparent lens body having a contact surface and a frontal surface, said lens body defining a plurality of axially elongated micro-passageways extending through said lens body in axially normal relation to at least one of the surfaces comprising said contact surface and said frontal surface, each of said micro-passageways including a radially enlarged portion having a generally spherical configuration and a pair of opposite end portions communicating with said enlarged portion, each of said end portions having a generally cylindrically tapered configuration converging toward said enlarged portion, one of said end portions opening through said contact surface, the other of said end portions opening through said front surface.

8. A contact lens as set forth in claim 7 wherein said lens body defines at least ten micro-passageways and not more than 20 micro passageways.

9. A contact lens as set forth in claim 7 wherein said lens defines 15 micro-passageways.

10. A contact lens comprising a transparent lens body having a contact surface and a frontal surface, said lens body defining a plurality of axially elongated micropassageways extending through said lens body in axially normal relation to at least one of the surfaces including said contact surface and said frontal surface, each of said micropassageways having a pair of opposite end portions and an intermediate portion disposed between and communicating with said opposite end portions, each of said opposite end portions having an outer end opening through an associated one of said surfaces including said contact surface and said frontal surface and an inner end opening into said intermediate portion, each of said opposite end portions having a generally cylindrical tapered configuration converging from said outer end to said inner end thereof, said intermediate portion having a major cross section greater than the cross section of the inner end of either of said opposite end portions.

* * * * *